US012359149B2

(12) United States Patent
Bystrom-Williams et al.

(10) Patent No.: US 12,359,149 B2
(45) Date of Patent: Jul. 15, 2025

(54) KOMBUCHA-BASED ALCOHOLIC BEVERAGE BREWING SYSTEM AND METHOD

(71) Applicant: Honeymoon Brewery, LLC, Santa Fe, NM (US)

(72) Inventors: Ayla K. Bystrom-Williams, Santa Fe, NM (US); James W.L. Hill, Santa Fe, NM (US)

(73) Assignee: Honeymoon Brewery, LLC, Santa Fe, NM (US)

( * ) Notice: Subject to any disclaimer, the term of this patent is extended or adjusted under 35 U.S.C. 154(b) by 0 days.

(21) Appl. No.: 18/397,330

(22) Filed: Dec. 27, 2023

(65) Prior Publication Data
US 2024/0247214 A1 Jul. 25, 2024

Related U.S. Application Data

(63) Continuation of application No. 16/610,456, filed as application No. PCT/US2018/030162 on Apr. 30, 2018, now abandoned.
(Continued)

(51) Int. Cl.
C12G 3/026 (2019.01)
C12G 3/02 (2019.01)
C12G 3/04 (2019.01)

(52) U.S. Cl.
CPC ............ C12G 3/026 (2019.02); C12G 3/02 (2013.01); C12G 3/04 (2013.01)

(58) Field of Classification Search
CPC ............ C12G 3/02; C12G 3/026; C12G 3/04
(Continued)

(56) References Cited

U.S. PATENT DOCUMENTS 4,494,451 A   1/1985   Hickey
5,718,161 A   2/1998   Beadle
(Continued)

FOREIGN PATENT DOCUMENTS

CN   103108847 A  *  5/2013   ............... C05D 9/00

OTHER PUBLICATIONS

"How to Make Kombucha" by Kombucha Home admin (hereafter, Kombucha) accessed at https://www.kombuchahome.com/how-to-make-kombucha-a-complete-beginners-guide (2016).*
(Continued)

Primary Examiner — Reginald Alexander
(74) Attorney, Agent, or Firm — Santa Fe IP, LLC

(57) ABSTRACT

A system for producing kombucha-based alcoholic beverage includes a brew vessel for steeping tea to form a tea liquor, a primary fermentation vessel configured for anaerobic fermentation of a tea liquor into an alcoholic brew, a secondary fermentation vessel configured for further anaerobic fermentation of the alcoholic brew to an alcohol by volume (ABV) of at least 7%, an aerobic fermenter for fermenting tea liquor when mixed with sugar and inoculated with a symbiotic culture of bacteria and yeast ("SCOBY") to form a fermented tea liquor, and a mixing tank dimensioned and configured to mix the alcoholic brew and the fermented tea liquor in desired ratios to produce a fermented alcoholic beverage having an ABV of approximately 3% to 7%. A method for producing kombucha-based alcoholic beverage is also disclosed.

16 Claims, 6 Drawing Sheets

Related U.S. Application Data

(60) Provisional application No. 62/492,782, filed on May 1, 2017.

(58) Field of Classification Search
USPC .................................................. 99/276, 277
See application file for complete search history.

(56) References Cited

U.S. PATENT DOCUMENTS

2009/0202676 A1* 8/2009 Colliver .................... A23F 3/40
426/597
2016/0050953 A1 2/2016 Hsu

OTHER PUBLICATIONS

Carr, *Wort Aeration & Oxygenation; Why It Helps Make Better Beer*, Kegerator.com, posted Sep. 16, 2015, retrieved Jul. 6, 2018 from https://learn.kegerator.com/wort-aeration-and-oxygenation.

ISA/US, *International Search Report*, International Application No. PCT/US2018/030162, Jul. 20, 2018.

Klein, *How to Brew Kombucha Beer*, posted Jan. 3, 2017, retrieved Jul. 5, 2018 from http://kombuchahome.com/brew-kombucha-beer/.

Klein, *How to Brew Kombucha Wine*, posted Jan. 16, 2017, retrieved Jul. 5, 2018 from http://kombuchahome.com/brew-kombucha-wine/.

Kombucha Home Admin, *How to Increase Alcohol Content of Kombucha Tea*, KombuchaHome.com, posted Apr. 19, 2015, retrieved Jul. 5, 2018 from http://kombuchahome.com/how-to-increase-alcohol-content-of-kombucha-tea.

Kombucha Home Admin, *How to Make Kombucha Alcohol*, KombuchaHome.com, posted Apr. 18, 2015, retrieved Jul. 5, 2018 from http://kombuchahome.com/how-to-make-kombucha-alcohol.

Kombucha Home Admin, *How to Make Kombucha*, KombuchaHome.com, posted Sep. 1, 2016, retrieved Jul. 5, 2018 from http://kombuchahome.com/how-to-make-kombucha-a-complete-beginners-guide.

Kombucha Home Admin, *How to Make Second Ferment Kombucha (And Why You Absolutely Should)*, KombuchaHome.com, posted Apr. 19, 2015, retrieved Jul. 5, 2018 from http://kombuchahome.com/how-to-make-second-ferment-kombucha-and-why-you-absolutely-should.

*Blending Wine with Pearson's Square, Winemaker's Academy*, 2014, accessed [by examiner] at https://winemakersacademy.com/blending-wine-pearsons-square/ (ADMIN).

* cited by examiner

KOMBUCHA-BASED ALCOHOLIC BEVERAGE BREWING SYSTEM AND METHOD

CROSS-REFERENCES TO RELATED APPLICATIONS

This application is a Continuation of U.S. patent application Ser. No. 16/610,456 filed Nov. 1, 2019 and published as US 2020/0063079 A1 on Feb. 27, 2020, which is a National Stage of International Patent Application No. PCT/US2018/030162 filed Apr. 30, 2018 and published as WO 2018/204243 on Nov. 8, 2018, which application claims priority to U.S. Provisional Patent Application No. 62/492,782 filed May 1, 2017, the entire contents of which is incorporated herein by this reference.

BACKGROUND OF INVENTION

Field of Invention

This application relates, in general, to systems for producing a fermented beverage and more particularly to systems for brewing kombucha-based alcoholic beverages, and to methods for their use.

Description of Related Art

Beer is believed to be the world's oldest and most widely consumed alcoholic beverage. Generally, beer is produced by the fermentation of starches derived from grains and flavored with hops. The strength of beer varies by local practice or beer style, however, the lagers that most consumers are familiar with fall in the range of 4-5% alcohol by volume (ABV).

Kombucha is a traditional Chinese beverage that has become more popular in recent years because kombucha is full of health-promoting probiotics, vitamins, minerals, antioxidants, enzymes, organic acids, electrolytes, and the like. Generally, kombucha is a fermented beverage of lightly effervescent sweetened black or green tea. Due to the fermenting process, traditional kombucha may have an alcohol content of 0.5-2.0% ABV. Controversy has arisen because the U.S. Alcohol and Tobacco Tax and Trade Bureau (TTB) has recently begun enforcing TTB regulations on any kombucha that is at or above 0.5% ABV, and requiring such kombucha to be comply with alcoholic beverage regulations.

The present invention is directed to innovative new alcoholic beverages that are based on hybridized fermentation processes, which beverages include the popular health-promoting components of traditional kombucha and an alcohol content similar to that of a craft beer.

Accordingly, the present invention is directed to producing an alcoholic beverage that is an alternative to traditional beers. In particular, a hybridized production process produces a fermented tea solution full of health-promoting probiotics that is utilized as a foundation for brewing a tasty, probiotic, alcoholic beverage inspired by traditional or craft style beers.

In light of the foregoing, it would be beneficial to have systems and methods which overcome the limitations of known fermenting processes for kombucha beverages.

BRIEF SUMMARY

One aspect of the present invention is directed to a system for brewing a fermented alcoholic beverage including a brew vessel for steeping tea in a quantity of hot water to form a tea liquor, a primary fermentation vessel for receiving the tea liquor and one or more yeasts and one or more fermentables, the primary fermentation vessel configured for anaerobic fermentation of the tea liquor into an alcoholic brew such that carbon dioxide released during primary fermentation escapes from the primary fermentation vessel and air is prevented from entering the primary fermentation vessel, a secondary fermentation vessel for receiving the alcoholic brew from the primary fermentation vessel, the secondary fermentation vessel configured for further anaerobic fermentation of the alcoholic brew to an alcohol by volume (ABV) of at least 7% such that carbon dioxide released during further anaerobic fermentation to escapes from the secondary fermentation vessel and air is prevented from entering the secondary fermentation vessel, an aerobic fermenter for fermenting the tea liquor when mixed with sugar and inoculated with a symbiotic culture of bacteria and yeast ("SCOBY") to form a fermented tea liquor, and a mixing tank configured for mixing the alcoholic brew having an ABV of at least 7% with a second batch of fermented tea liquor, the mixing tank dimensioned and configured to mix the alcoholic brew and the second batch of fermented tea liquor in desired ratios to produce a fermented alcoholic beverage having an ABV of approximately 3% to 7%.

The brew vessel may be a heated liquor tank.

The aerobic fermenter may include a fermentation filter prevent outside contamination to the tea liquor/sugar mixture.

The system may further include a cooler for cooling the tea liquor.

The primary fermentation vessel may include an oxygen supply for aerating the tea liquor.

The primary fermentation vessel may include a first fermentation lock to allow carbon dioxide released during primary fermentation to escape from the primary fermentation vessel while preventing air from entering the primary fermentation vessel.

The secondary fermentation vessel may include a second fermentation lock to allow carbon dioxide released during further anaerobic fermentation to escape from the secondary fermentation vessel while preventing air from entering the secondary fermentation vessel.

Another aspect of the present invention is directed to a method for brewing a fermented alcoholic beverage including preparing a first tea solution, including steeping tea in a quantity of hot water to form a tea liquor, straining the tea from the tea liquor, and cooling the tea liquor/sugar mixture, preparing a primary brew in a first anaerobic fermenter using the first tea solution as an anaerobic nutrient solution, including aerating the first tea solution, adding anaerobic fermentation yeast to the first tea solution, adding sugar to the first tea solution, and anaerobically fermenting the first tea solution to form a primary brew, transferring the primary brew from the first anaerobic fermenter to a second anaerobic fermenter to allow removal of yeast particulate formed during primary fermentation, preparing a secondary brew in the second anaerobic fermenter, including anaerobically fermenting the anaerobic formation yeast remaining in the primary brew to form a secondary brew having an elevated alcohol by volume (ABV), preparing a second fermented tea solution, including steeping tea in a quantity of hot water to form a second tea liquor, straining the tea from the tea liquor, adding sugar to the second tea liquor to form a second mixture that will serve as a second aerobic nutrient solution for aerobic fermentation, diluting the second mixture, cooling the second mixture, inoculating the second mixture with a symbiotic culture of bacteria and yeast ("SCOBY") to begin fermentation, and aerobically fermenting the second mixture, wherein the second fermented tea solution includes live probiotic colonies, and mixing the secondary brew and second fermented tea solution together to form the fermented alcoholic beverage, wherein the fermented alcoholic beverage includes active probiotic colonies and an ABV of approximately 3% to 7%.

The secondary brew may have an ABV of approximately 8-9%.

The secondary brew may have an ABV of at least 7%, and mixing the secondary brew and the second fermented tea solution together may form the fermented alcoholic beverage having an ABV of approximately 4% to 7%.

The fermented alcoholic beverage may have an ABV of approximately 4% to 6%.

Another aspect of the present invention is directed to a method for brewing a fermented alcoholic beverage including preparing a first fermented tea solution, including: steeping tea in a quantity of hot water to form a tea liquor; straining the tea from the tea liquor; adding sugar to the tea liquor to form a tea liquor/sugar mixture that will serve as an aerobic nutrient solution for aerobic fermentation; diluting the tea liquor/sugar mixture; cooling the tea liquor/sugar mixture; inoculating the tea liquor/sugar mixture with a symbiotic culture of bacteria and yeast ("SCOBY") to begin fermentation, reducing the number of viable microbes in the first fermented tea solution, preparing a primary brew in a first anaerobic fermenter using the first fermented tea solution as an anaerobic nutrient solution, including: aerating the first fermented tea solution; adding anaerobic fermentation yeast to the first fermented tea solution, adding sugar to the first fermented tea solution; and anaerobically fermenting the first fermented tea solution to form a primary brew; transferring the primary brew from the first anaerobic fermenter to a second anaerobic fermenter to allow removal of yeast particulate formed during primary fermentation, preparing a secondary brew in the second anaerobic fermenter, including: anaerobically fermenting the anaerobic formation yeast remaining in the primary brew to form a secondary brew having an elevated alcohol by volume (ABV), preparing a second fermented tea solution, including steeping tea in a quantity of hot water to form a second tea liquor; straining the tea from the tea liquor; adding sugar to the second tea liquor to form a second mixture that will serve as a second aerobic nutrient solution for aerobic fermentation; diluting the second mixture; cooling the second mixture; inoculating the second mixture with a second symbiotic culture of bacteria and yeast ("second SCOBY") to begin fermentation; and aerobically fermenting the second mixture, wherein the second fermented tea solution includes live probiotic colonies, and mixing the secondary brew and second fermented tea solution together to form the fermented alcoholic beverage, wherein the fermented alcoholic beverage includes active probiotic colonies and an ABV of approximately 3% to 7%.

The fermented tea solution may be a kombucha or a Jun.

Aerobic fermentation of the tea liquor/sugar mixture may continue until the SCOBY digests a sufficient amount of sugar dissolved in the tea liquor and the first fermented tea solution has a pH of approximately 2.5-3.5.

The method may further include cooling the first fermented tea solution prior to anaerobically fermenting the first fermented tea solution.

The primary fermentation yeast may consist of a yeast starter from the SCOBY, a champagne yeast, a wine yeast, a cider yeast, a beer yeast, or a combination thereof.

The secondary brew may have an ABV of approximately 8-9%.

Aerobic fermentation of the second mixture may continue until the SCOBY digests the sugar dissolved in the tea liquor to produce a second fermented tea solution having a pH of approximately 2.5-3.5.

The secondary brew may have an ABV of at least 7%, and mixing the secondary brew and the second fermented tea solution together may form the fermented alcoholic beverage having an ABV of approximately 4% to 7%.

The fermented alcoholic beverage may have an ABV of approximately 4% to 6%.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
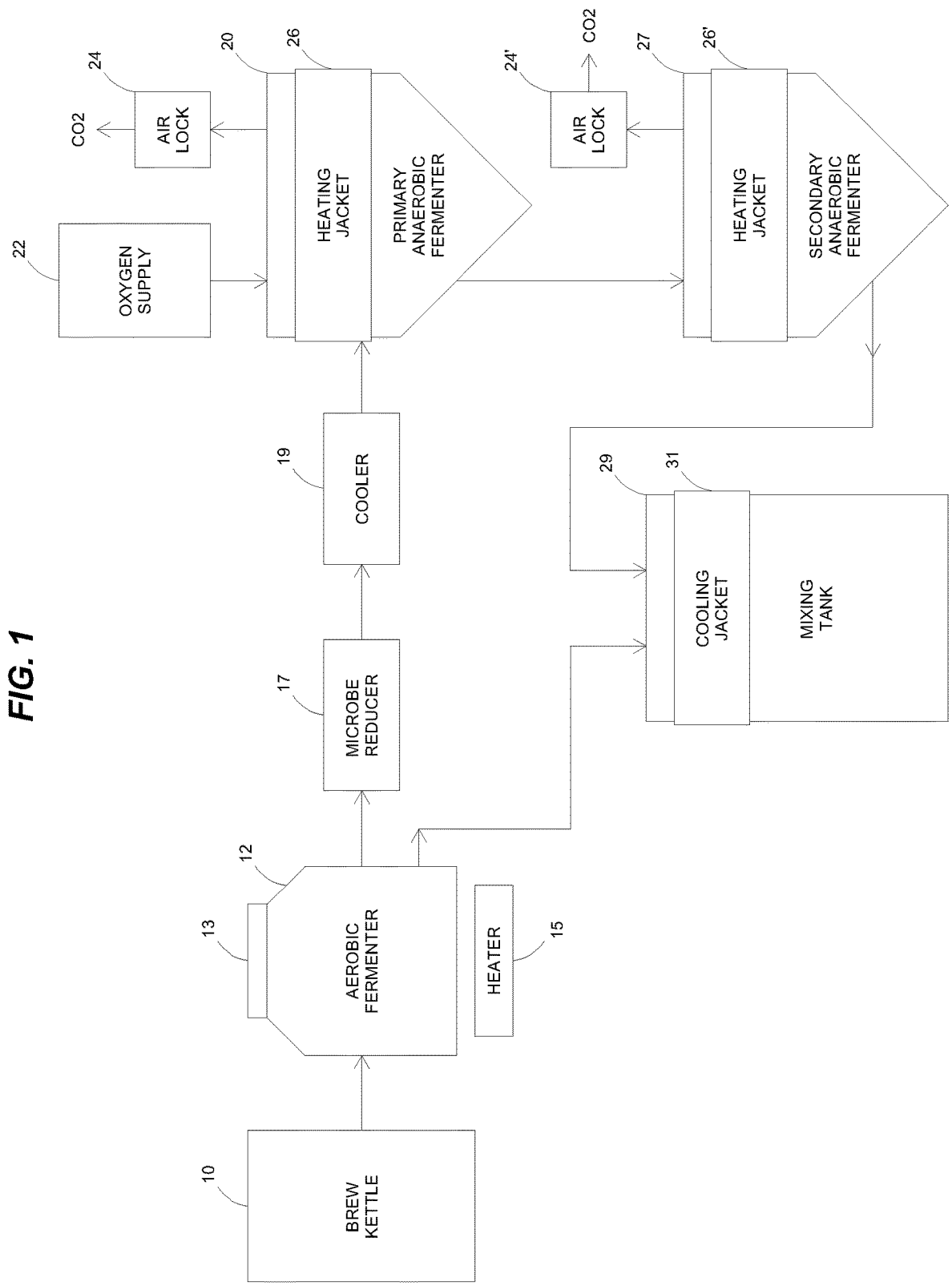
FIG. 1 is a schematic view of an exemplary system for producing a fermented alcoholic beverage in accordance with various aspects of the present invention.
Figure 2:
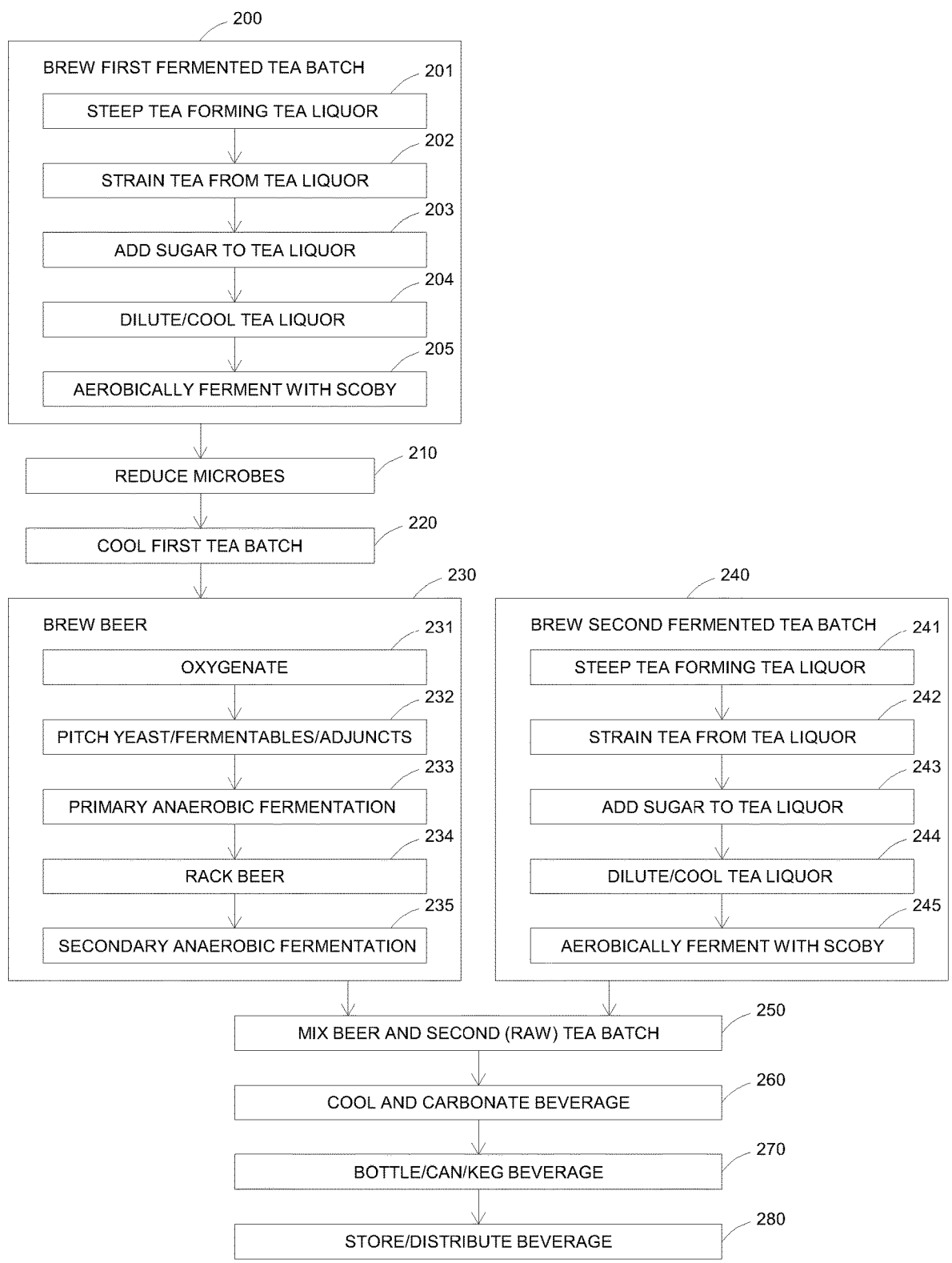
FIG. 2 is a schematic view of an exemplary method for producing a fermented alcoholic beverage in accordance with various aspects of the present invention.

Turning now to the drawings, wherein like components are designated by like reference numerals throughout the various figures, FIG. 1 shows an exemplary system for producing fermented alcoholic beverages in accordance with various embodiments of the present invention, and FIG. 2 shows an exemplary method for producing such beverages in accordance with various embodiments of the present invention.

With reference to FIG. 2, one method according to various aspects of the present invention generally includes the brewing of a first fermented tea batch in an aerobic fermentation vessel (step 200), pasteurizing and cooling the first tea batch (steps 210 and 220) and using the pasteurized/sterilized tea batch to brew "beer" or "wine" (step 230) including a primary anaerobic fermentation (step 233) and a secondary fermentation (step 235), brewing a second fermented tea batch (step 240), and mixing the "beer" or "wine" and the raw second fermented tea batch (step 250) to form a kombucha "beer" or "wine" having an ABV that is on the order of a traditional or craft style beer, namely a kombucha-based alcoholic beverage having an ABV that is in the range of approximately 3-7% ABV, preferably in the range of approximately 4-6% ABV and preferably in the range of approximately 4.5-5.5% ABV.

The first step is brewing a first batch of fermented tea solution (step 200). The fermented tea solution may be kombucha, Jun, a similarly-styled fermented tea beverage, or a combination thereof. This first requires the steeping of tea (e.g., leaves, leaf buds and or internodes of a tea plant) in a quantity of hot water (step 201) to form a tea liquor that will serve as a nutrient solution for subsequent fermentation. Generally, black or green tea is used to produce kombucha, and green tea for Jun. Such steeping may be accomplished in a brew vessel such as a hot liquor tank or a brew kettle 10 shown in FIG. 1. One will appreciate that such steeping may also be performed in other suitable vessels such as a cask, kettle, pot, outdoor sun tea vessels, and/or other container that may be actively or passively heated or receive heated water.

In various embodiments, a five-gallon batch of tea liquor may be produced by steeping approximately 30-90 grams, preferably approximately 45-75 grams, and more preferably approximately 60 grams of tea in one gallon of water for a predetermined time at a predetermined temperature. As noted above, black or green tea is generally used for kombuchas, and green tea for Juns. However, one will appreciate that other suitable teas, including other types of *Camellia sinensis*, may be utilized, and/or combinations thereof may be utilized to provide a desired tea liquor. The tea may be steeped in the hot water for approximately 10-50 minutes, preferably approximately 25-35 minutes, and more preferably approximately 30 minutes. The temperature of the water is approximately 175° F. to 212° F., preferably approximately 191-201° F., and more preferably at 196° F. It should be noted that a "five-gallon" batch is intended to be exemplary, and that one would appreciate that batches may be scaled up or down, and the particular ingredients and portions thereof varied according to desired flavor profiles.

Once the tea has been steeped and the tea liquor has formed, loose tea and/or other tea particulates are strained from the tea liquor (step 202). Next, sugar is added to the tea liquor, and this mixture will serve as a nutrient source during the tea fermentation process (step 203). In the case of a five-gallon batch, approximately 1000-1400 grams, preferably approximately 1100-1300 grams, and more preferably 1200 grams of cane sugar is added to the tea liquor, however, one will appreciate that other suitable sugars may be used. For example, honey may be added in the case that a Jun is the desired product. The elevated temperature of the tea liquor will facilitate dissolving of the sugar. The tea liquor may then be diluted with water to bring the volume of the tea liquor to a desired volume, and to cool the tea liquor and sugar mixture (step 204). For example, four gallons of water may be added to bring the volume of the tea liquor to five gallons and to bring the tea liquor down to room temperature, preferably approximately 65-70° F.

Once the tea liquor/sugar mixture has sufficiently cooled, it is then fermented in an open container such as a wide-mouth aerobic fermenter 12 shown in FIG. 1 (step 205). One will appreciate that such tea fermentation may also be performed in other suitable containers such as casks, pots or other containers that are open directly to ambient air, or enclosed containers that are connected to ambient air by air stones or other suitable aeration devices. The tea liquor/sugar mixture is inoculated with a symbiotic culture of bacteria and yeast ("SCOBY") to begin the tea fermentation process. The open container is open to ambient air to allow maximum surface to air exposure and allow an aerobic fermentation which favors bacterial colonies found within the SCOBY and their oxygen needs. Preferably, the open container includes a fermentation filter 13 to minimize the odds of outside contamination to the tea liquor/sugar mixture before the bacteria and yeast colonies of the SCOBY are properly established. In various embodiments, the fermentation filter is a cloth or paper filter, such as cheesecloth or other suitable means to prevent undesired outside contamination.

In various embodiments, some fermented beverage starter fluid may be added to the tea liquor mixture to facilitate the fermentation process. The starter fluid is generally a volume of liquid that is taken from a previously-prepared batch of fermented tea. For example, when preparing a five-gallon fermented tea batch, approximately 0.5 gallons of a previously-prepared fermented tea may be added to the tea liquor mixture along with the SCOBY to assist the SCOBY in the fermentation process.

Once the tea liquor mixture has been inoculated with the SCOBY, the tea fermentation process continues until the SCOBY sufficiently digests the sugar dissolved in the tea liquor thereby producing a fermented tea solution of a desired pH and/or flavor profile. In various embodiments, a desired pH of the fermented tea solution is approximately 2.5 to 3.5, and preferably approximately 2.8 to 3.2.

The tea fermentation process (step 205) will generally continue for 6-14 days to form a fermented tea solution, however, one will appreciate that the fermentation process may take less or more time. At this stage, the fermented tea solution is full of active health-promoting probiotics, vitamins, minerals, antioxidants, enzymes, organic acids, electrolytes, and the like.

In accordance with various embodiments of the present invention, the inoculated tea liquor mixture within the open container, such as wide-mouth fermenter 12 is maintained at an elevated temperature, preferably between 80-85° F. As the open container is open to the ambient environment, the room or space housing the open container may be maintained at the desired elevated temperature with a heater 15. One will also appreciate that other suitable means may be utilized to maintain the contents of the open container at the desired temperature, for example by connecting the heater to the open container via a suitable heat exchanger.

Once the desired pH and/or flavor profile of the fermented tea solution are achieved, the SCOBY may be removed from the aerobic fermenter 13, and the SCOBY (or a portion thereof) may be utilized to inoculate a later batch of fermented tea. The solution may then be transferred to, or through, a pasteurizer/sterilizer 17 shown in FIG. 1, and the fermented tea solution pasteurized, sterilized, or otherwise processed to effectively reduce the number of viable microbes therein (step 210). Accordingly, the pasteurizer/sterilizer may be generically referred to as a "microbe reducer". This is done to stop bacterial growth and metabolic activities within the fermented tea solution prior to primary fermentation, so as to promote growth and metabolic activities of the primary fermentation yeast discussed below.

In the case of a five-gallon batch, the fermented tea solution may be pasteurized at approximately 165° F. for approximately 90 seconds in a boil kettle. On will appreciate that other suitable means may be utilized to pasteurize/sterilize the fermented tea solution. For example, the fermented tea solution may be passed through an ultraviolet pasteurizer to preserve fragile components of the tea solution by avoiding direct heat. Alternatively, flash or high-temperature short-time (HTST) pasteurization, E-beam pasteurization, sterile filtration, and/or other methods may be utilized to effectively reduce the number of viable microbes. One will appreciate that once pasteurized and/or sterilized, the health-promoting probiotics, in the fermented tea solution will no longer be active.

Once pasteurized/sterilized, the fermented tea solution is allowed to cool (step 220) before primary anaerobic fermentation begins. In various embodiments, the product may be cooled with a heat exchanger as it is transferred, for example, as it passes through an in-line cooler 19 shown in FIG. 1.

Once cooled, the fermented tea solution is utilized to brew "beer" or "wine" or "hard kombucha" (step 230) wherein the fermented tea solution is transferred to a primary fermentation vessel to serve as a nutrient solution for primary fermentation. For the purposes of the present application, "nutrient solution" is largely synonymous with the conventional terms "wort" and "must" in that these terms refer to the liquid base into to which yeast is "pitched" or added for anaerobic fermentation. Similarly, for the purposes of the present application, "hard kombucha" is largely synonymous with the conventional terms "beer" and "wine" in that these terms refer to an alcoholic beverage that is formed by anaerobic fermentation of the nutrient solution. In various embodiments, the primary fermentation vessel is an anaerobic fermenter 20 shown in FIG. 1, however, one will appreciate that various suitable vessels may be utilized including, but not limited to, conical fermenters, carboys, fermentation buckets, or other suitable means.

The primary fermentation vessel includes an oxygen supply 22 to aerate the wort (step 231) prior to pitching yeast to the wort (step 232), that is, prior to adding yeast to the wort to begin the primary fermentation. The oxygen supply may be in the form of an air supply (e.g., an air pump) or a pure oxygen supply (e.g., an oxygen tank), that selectively supplies oxygen to the wort through an air stone, carbonating stone, diffusion stone, oxygenation stone or other suitable filtering means in an otherwise conventional manner.

In the primary fermentation vessel 20, a primary fermentation yeast is added to the wort (step 231). The primary fermentation yeast may include a yeast starter from the SCOBY, a champagne yeast, a wine yeast, a cider yeast, a beer yeast, or a combination thereof. In addition, the first of several staggered additions of yeast nutrient and yeast energizer may be added to the wort. The nutrient regimen of the yeast nutrient and yeast energizer may be tailored to fit the quantities of yeast cells pitched to the wort, as well as the quantity of yeast assimilable nitrogen (YAN) found in the nutrient solution. Of particular note, the YAN of the nutrient solution is different than the YAN content in a typical beer wort as the nutrient solution was not made from grains as is the case with traditional beers. One will appreciate that there may be other differences in quantities of other macronutrients and micronutrients in the nutrient solution as compared to traditional grain-based beer wort.

In various embodiments, a quantity of juice and/or more cane sugar may be added to the nutrient solution. One will appreciate that various juices may be used including, but not limited to, raw organic grape juice, concentrated grape juice, and other fruit and/or vegetable juices. In various embodiments, a sufficient amount of additional sugar from the cane sugar and/or juice to provide a target alcohol content of at least 7%, and preferably approximately 7.5% to 9.5%, and more preferably approximately 8%-9% ABV.

Various means may be utilized to determine ABV. Original specific gravity (OG) and final specific gravity (FG) may be utilized. However, specific gravity readings alone may be unreliable due to the composition of kombucha. Accordingly, more accurate ABV measurements may be obtained via other means such as gas chromatography (GC), gas chromatography/mass spectrometry (GC-Mass Spec), high pressure liquid chromatography (HPLC), refractometry combined with hydrometry, ebulliometry, and/or other suitable means. Alternatively, alcohol content may be determined by measuring the sugar content of the nutrient solution, that is, measuring degrees Brix (° Bx) using refractometry, near infrared (NIR) spectrometry or Fourier transform infrared (FT-IR) spectrometry techniques, and/or other suitable means.

In various embodiments, the primary fermentation vessel includes a fermentation lock 24 that allows carbon dioxide released during primary fermentation (step 233) to escape from the primary fermentation vessel while not allowing air to enter the primary fermentation vessel, thus avoiding oxidation of the wort therein. The fermentation lock may be a bubbler airlock, a three-piece airlock, or other suitable off-gassing means that allows the release of carbon dioxide while preventing air from entering. The fermentation lock may be incorporated as part of the design of the primary fermentation vessel, or it may be attached to the primary fermentation vessel once the yeast, fermentables (e.g., cane sugar and/or juice), yeast nutrients (e.g., FERMAX, GO-FERM), yeast energizers, and/or other adjuncts have been added to the wort.

The fermentation lock creates an anaerobic environment within the primary fermentation vessel in which the primary fermentation yeast can metabolize the sugars into ethanol and carbon dioxide. Of note, any bacteria and yeast of the original SCOBY remaining in the nutrient solution transferred from the pasteurizer/sterilizer 17 does not and cannot contribute to fermentation at this stage because such bacteria and yeast was pasteurized/sterilized in the pasteurizer/sterilizer 17 (step 210) prior to transfer of the fermented tea solution to the primary fermentation vessel 20 and primary fermentation (step 233).

Depending on the particular yeast strain(s) of the primary fermentation yeast, the primary fermentation vessel is maintained at a desired temperature range that facilitates anaerobic fermentation within the primary fermentation vessel. For example, the primary fermentation vessel 20 may be equipped with a heating jacket 26 or other suitable temperature-control means that maintains the wort at a desired temperature within the vessel. Alternatively, the vessel may be placed within a temperature-controlled chamber to keep the wort within fermenting at the ideal temperature ranges for the specific yeast strain(s). In various embodiments, the wort is maintained at a temperature within the range of 67-75° F.

The primary fermentation continues until off-gassing from the primary fermentation vessel through the fermentation lock 24 notably diminishes thus indicating high attenuation, that is, a high percentage of sugars consumed by the primary fermentation yeast during fermentation. The primary fermentation generally continues for less than 30 days, preferably 1-3 weeks, and more preferably approximately 7 to 10 days.

In various embodiments, additional staggered additions of yeast nutrient and yeast energizer may be added to the wort during primary fermentation. This may be done because giving the wort all the required nutrients at once is generally not as effective as dosing them out over the course of several days and specific gravity levels. During this process, the brew within the primary fermentation vessel is sampled periodically using a hydrometer and/or a refractometer to determine periodic specific gravity readings to determine whether further nutrients are required and to determine when fermentation is nearing completion. For example, in various embodiments a final specific gravity (SG) of 1.005 to 1.01 generally indicates that fermentation is complete. One will appreciate that, as noted above, kombucha generally contains a variety of compounds that affect specific gravity other than sugar and ethanol. Accordingly, other means may be used to accurately measure ABV as discussed above.

In various embodiments, the brew may be racked (step 234), that is, transferred from the primary fermentation vessel 20 to a secondary fermentation vessel 27 to begin a secondary fermentation (step 235). For example, once the primary fermentation is highly attenuated (e.g., after a fermentation period of 7 to 10 days), the brew may be racked (i.e., transferred) from the primary fermentation vessel into the second fermentation vessel, which allows removal of yeast particulate from the brew resulting in a clearer brew and minimizing off-flavors of the final product. For example, the brew may be drained from the primary fermentation vessel such that the yeast cake, trub or other undesired sediment fallen to the bottom of the primary fermentation vessel remains in the primary fermentation vessel and can be later disposed of.

Like the primary fermentation vessel, the secondary fermentation vessel also includes a fermentation lock 24' and a heating jacket 26'. As such, a temperature-controlled anaerobic environment is created within the secondary fermentation vessel that allows further fermentation in which remaining yeast in the brew can further metabolize remaining sugars into further ethanol and carbon dioxide. The further secondary fermentation may be performed under the same temperature parameters as the primary fermentation discussed above and allowed to continue for an additional 2-3 weeks. Such secondary fermentation generally mellows and blends the flavors of the brew while causing additional alcohol production.

While the secondary fermentation (step 235) takes place, a second batch of fermented tea solution is prepared (step 240) that will later be used to mixed with the brew resulting from the secondary fermentation. The second batch is produced the same manner as the first, however, the second batch is not pasteurized/or sterilized.

For example, the second batch of fermented tea solution may be produced by steeping tea in a vessel (step 241), straining loose tea and/or other tea particulates from the resulting tea liquor (step 242), adding sugar to the tea liquor (step 243), diluting and cooling the tea liquor (step 244) transferring to an open container and inoculating the tea liquor with a SCOBY to begin the tea fermentation process (step 245) in a manner similar to that discussed above. One will appreciate that the second batch may be brewed in the same equipment as the first batch (e.g., brew kettle 10 and wide-mouth fermenter 12) or in other similar equipment. Since the second batch is not pasteurized/sterilized, the resulting solution is raw kombucha and/or raw Jun that contains live probiotic colonies and beneficial enzymes.

Once the second batch and the secondary brew are ready, the two are mixed together in a mixing tank 29 (step 250) such that a final beverage is formed having a desired ABV of approximately 4% to 6%, and preferably in the range of 4.5% to 5.5%. Such mixing also serves to produce a desired flavor profile as well as reintroduce live probiotic colonies and beneficial enzymes into the final beverage. For example, the beer brew having an ABV of approximately 8-9% (step 230) and the second tea batch having an ABV of approximately 1% (step 240) may be mixed (step 250) in a 1:1 ratio in order to produce a kombucha-based alcoholic beverage having an ABV of approximately 4.5% to 5.5%. Since the mixing ratio is approximately 1:1, the mixing tank 29 may be dimensioned to hold a volume of liquid that is approximately double that of the secondary anaerobic fermenter 27, or about double that of the volume of the secondary brew (if less than the volume of the secondary anaerobic fermenter).

Since the second batch of fermented tea solution raw kombucha and/or Jun, it still contains active health-promoting probiotic colonies and beneficial enzymes, the final beverage will similarly be full of active health-promoting probiotic colonies and beneficial enzymes.

In various embodiments, the mixing tank 29 may be a brite tank, keg or other suitable storage container. Preferably the mixing tank is maintained at a reduced temperature that minimizes further fermentation. One will appreciate that the mixing tank 29 may be provided with a cooling jacket 31 to facilitate temperature control, or other suitable means may be provided to control the temperature of the mixing tank.

The mixing tank is maintained at temperatures in the range of 30-35° F. to minimize further fermentation. The mixing tank may also be purged with carbon dioxide as an additional effort to minimize further fermentation as well as to begin a forced carbonation schedule. For example, 5 to 7 days of forced carbonation at about 30 psi, or longer at a lower pressure of about 15 psi, depending on the specifications of the mixing tank, the final beverage in the mixing tank is ready to be drawn out into bottles, kegs or other suitable distribution containers.

In various embodiments, other further ingredients may be added to the mixture in the mixing tank to further enhance the flavor profile of the final beverage. For example, freshly juiced organic ginger juice and/or fresh lemon juice may be added to further balance the flavor profile and improve the bouquet of the beverage.

Advantageously, hybrid processes in accordance with various embodiments allow balancing the multiple microorganisms found in fermented tea brewing and beer brewing provide the opportunity of creating a delicious beverage that contains both a raised alcohol content compared to traditional fermented teas, as well as the various beneficial metabolites associated with traditional fermented tea brewing.

Advantageously, hybrid processes in accordance with various embodiments allow a quicker brewing process than competitive alcoholic beverages. For example, many mixed-culture barrel-aged sour ales and existing alcoholic kombucha beverages may take 6-12 months to prepare. In contrast, kombucha-based alcoholic beverages made in accordance with various embodiments of the present invention may be prepared in less than 2 months, and in some instances as little as one month, while preserving the more complex flavor profiles generally not found in single-culture brews using *Lactobacillus* (e.g., kettle soured or sour mashed brews).

Figure 4:
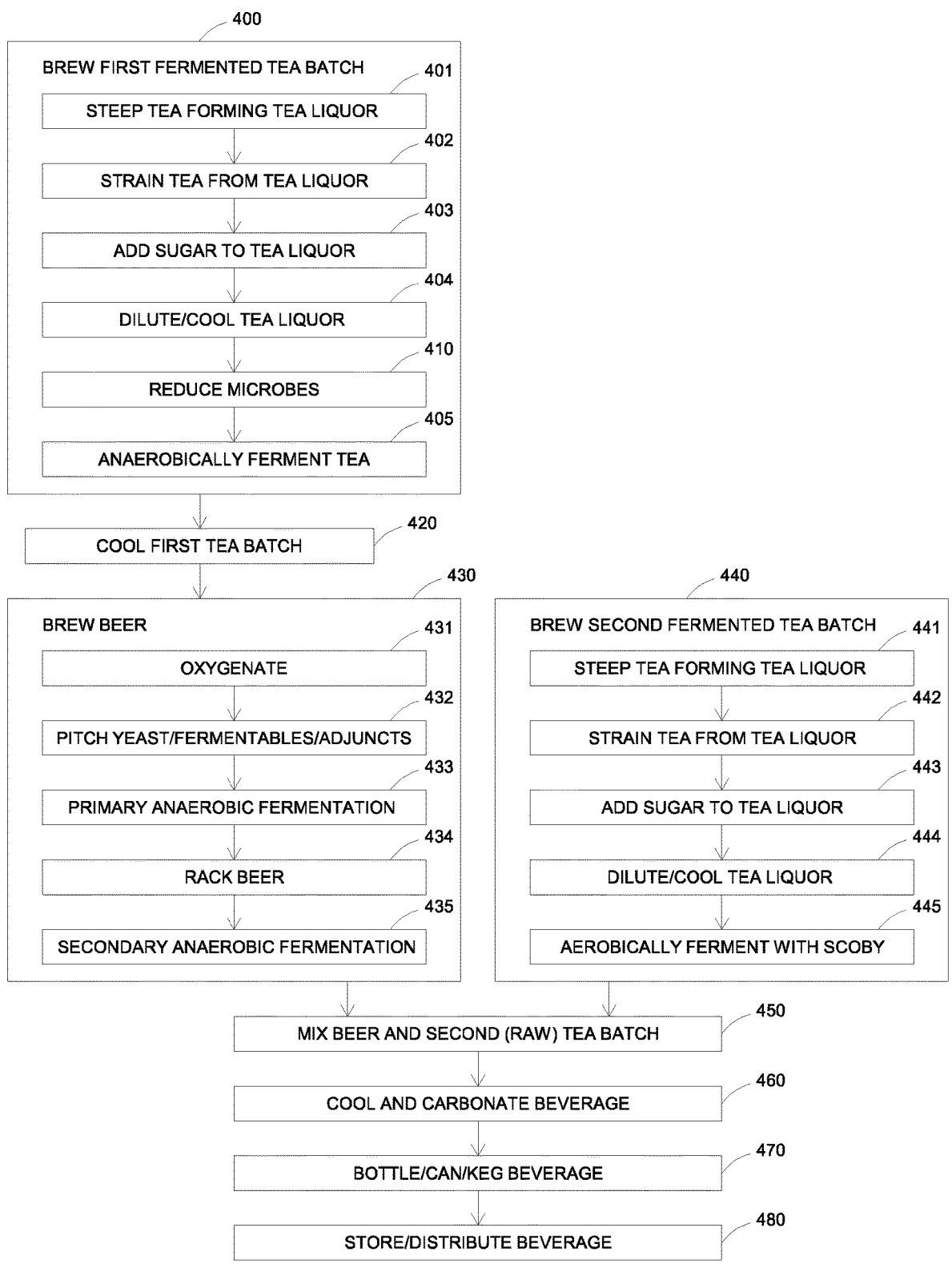
FIG. 4 is a schematic view of another exemplary method for producing a fermented alcoholic beverage in accordance with various aspects of the present invention.

In accordance with other aspects of the present invention, it is also possible to brew a fermented alcoholic beverage using an anaerobically fermented "hard" tea to brew "beer" or "wine" (instead of an aerobically fermented tea, as discussed above with respect to FIGS. 1 and 2), which "beer" or "wine" is then mixed with a raw fermented tea batch to form a kombucha "beer" or "wine" also having an ABV that is on the order of a traditional or craft style beer, namely a kombucha-based alcoholic beverage having an ABV that is in the range of approximately 3-7% ABV, preferably in the range of approximately 4-6% ABV and more preferably in the range of approximately 4.5-5.5% ABV With reference to FIG. 4, such a hard-tea method is similar to that shown in FIG. 2, but generally includes the brewing of a first fermented tea batch in an anaerobic fermentation vessel (step 400), and using the pasteurized/sterilized tea batch to brew "beer" or "wine" (step 430) with a primary anaerobic fermentation (step 433) and a secondary fermentation (step 435), brewing a raw second fermented tea batch (step 440), and mixing the "beer" or "wine" and the raw second fermented tea batch (step 450) to form a kombucha alcoholic beverage having an ABV that is in the range of approximately 3-7% ABV and preferably in the range of 4-6%, and more preferably in the range of approximately 4.5-5.5% ABV.

Figure 3:
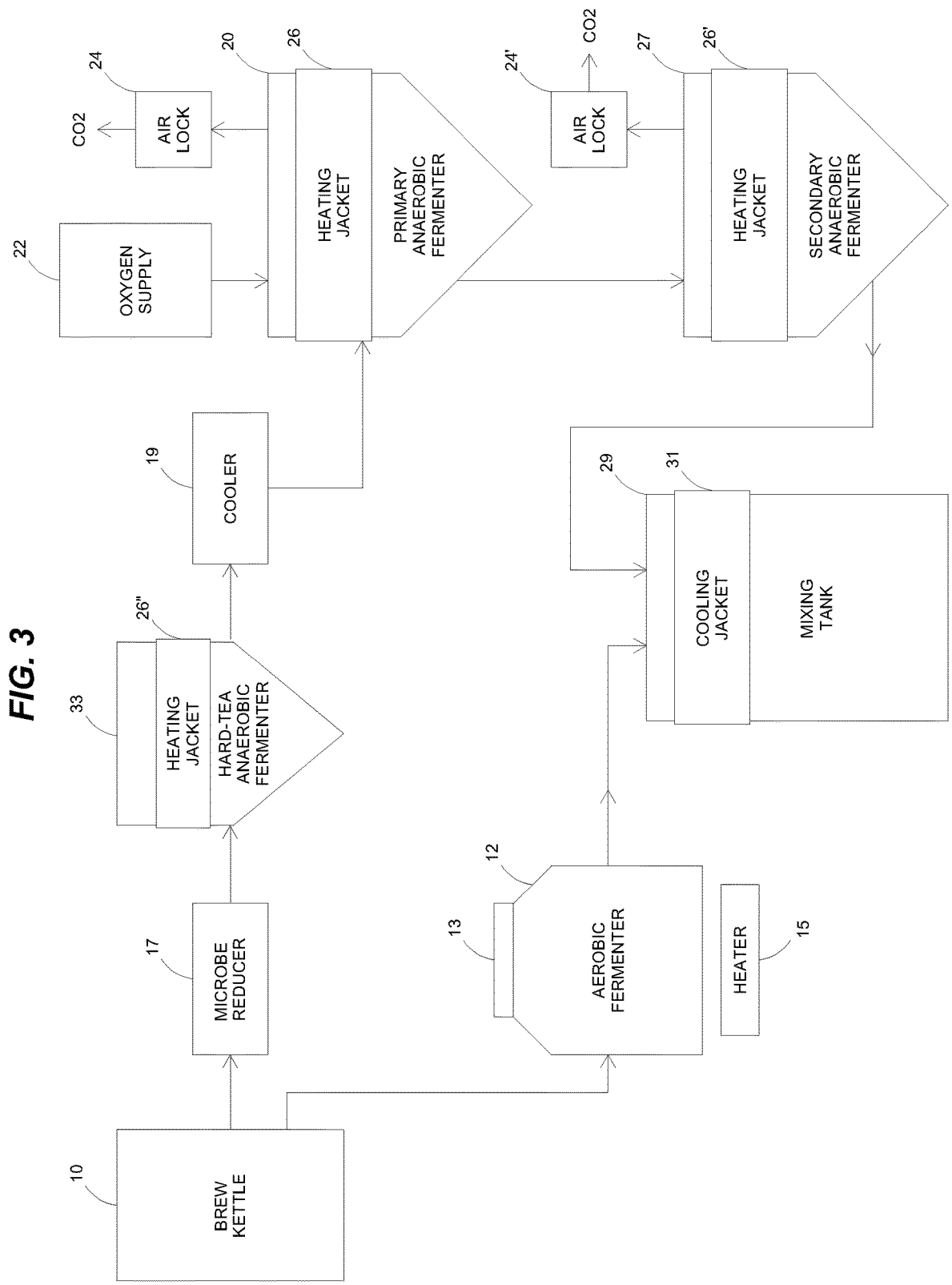
FIG. 3 is a schematic view of another exemplary system for producing a fermented alcoholic beverage in accordance with various aspects of the present invention.

With reference to FIG. 3, many aspects of the hard-tea system are similar to that described above, however, the first fermented tea batch is a "hard" tea that is anaerobically fermented (step 405). Various fermentation yeasts may be utilized to brew the hard tea including a yeast starter from a SCOBY, a champagne yeast, a wine yeast, a cider yeast, a beer yeast, or a combination thereof.

The hard-tea is anaerobically fermented in an anaerobic fermenter 33 that may include a heating jacket 26" like the anaerobic fermenters noted above. In this case, the pasteurization/sterilization may take place after the fermentation in a manner that is shown in FIG. 1 and described in FIG. 2, or the pasteurization/sterilization may take place before the hard-tea fermentation, as is shown in FIG. 3 (see step 410).

Once cooled, the fermented hard-tea solution is utilized to brew "beer" or "wine" (step 430) wherein the fermented tea solution is transferred to a primary fermentation vessel to serve as a nutrient solution for primary fermentation, and then transferred to a secondary fermentation vessel for further fermentation to provide an elevated ABV.

Like the methods described above, a second batch of fermented tea solution is concurrently prepared (step 440) that will later be used to mixed with the brew resulting from the secondary fermentation. The second batch of fermented tea solution may be produced by steeping tea in a vessel (step 441), straining loose tea and/or other tea particulates from the resulting tea liquor (step 442), adding sugar to the tea liquor (step 443), diluting and cooling the tea liquor (step 444) transferring to an open container and inoculating the tea liquor with a SCOBY to begin the tea fermentation process (step 445) in a manner similar to that discussed above. In this case, the second batch will be brewed in different equipment than the first batch, namely in aerobic fermenter 12 and not in anaerobic fermenter 33. Since the second batch is not pasteurized/sterilized, the resulting solution is raw kombucha and/or raw Jun that contains live probiotic colonies and beneficial enzymes.

Once the second batch and the secondary brew are ready, the two are mixed together in a mixing tank 29 (step 450) such that a final beverage is formed having a desired ABV of approximately 4% to 6%, and preferably in the range of 4.5% to 5.5%. Again, such mixing also serves to produce a desired flavor profile as well as reintroduce live probiotic colonies and beneficial enzymes into the final beverage. For example, the beer brew having an ABV of approximately 8-9% (step 430) and the second tea batch having an ABV of approximately 10% (step 440) may be mixed (step 450) in a 1:1 ratio in order to produce a kombucha-based alcoholic beverage having an ABV of approximately 4.5% to 5.5%.

Since the second batch of fermented tea solution is raw kombucha and/or Jun, it still contains active health-promoting probiotic colonies and beneficial enzymes, the final beverage will similarly be full of active health-promoting probiotic colonies and beneficial enzymes.

Figure 6:
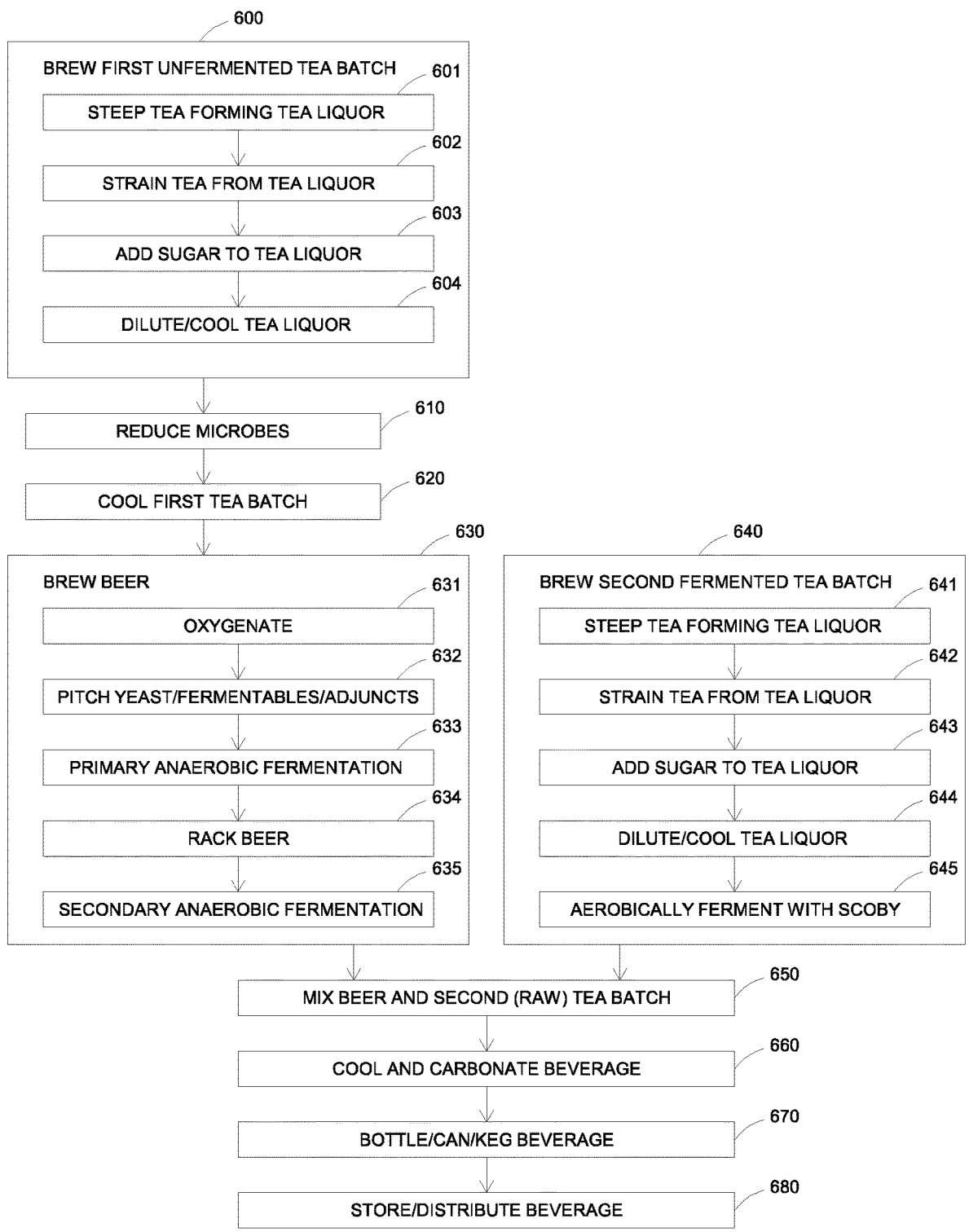
FIG. 6 is a schematic view of another exemplary method for producing a fermented alcoholic beverage in accordance with various aspects of the present invention.

In accordance with still other aspects of the present invention, it is also possible to brew a fermented alcoholic beverage using an unfermented tea to brew "beer" or "wine" (instead of a fermented tea, as discussed above with reference to FIGS. 1-4), which "beer" or "wine" is then mixed with a raw fermented tea batch to form a kombucha "beer" or "wine" also having an ABV that is on the order of a traditional or craft style beer, namely a kombucha-based alcoholic beverage having an ABV that is in the range of approximately 3-7% ABV, preferably in the range of approximately 4-6% ABV and more preferably in the range of approximately 4.5-5.5% ABV With reference to FIG. 6, such a hard-tea method is similar to that shown in FIGS. 2 and 4, but generally includes the brewing of a first unfermented tea batch in a brew kettle (step 600), and using the first unfermented tea batch to brew "beer" or "wine" (step 630) with a primary anaerobic fermentation (step 633) and a secondary fermentation (step 635), brewing a second fermented tea batch (step 640), and mixing the "beer" or "wine" and the raw second fermented tea batch (step 650) to form a kombucha alcoholic beverage having an ABV that is in the range of approximately 3-7% ABV and preferably in the range of 4-6%, and more preferably in the range of approximately 4.5-5.5% ABV.

Figure 5:
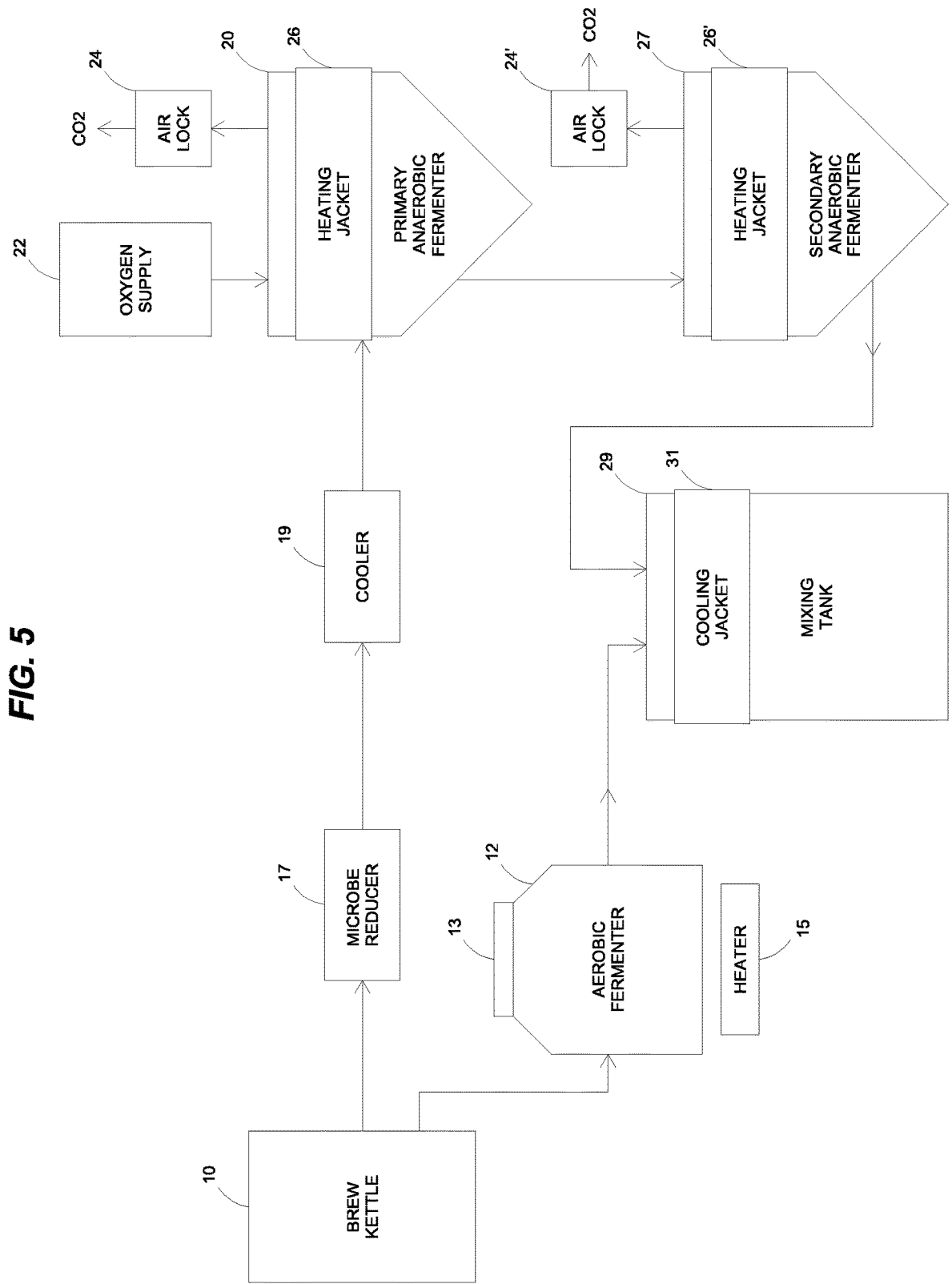
FIG. 5 is a schematic view of another exemplary system for producing a fermented alcoholic beverage in accordance with various aspects of the present invention.

With reference to FIG. 5, many aspects of the unfermented tea system are similar to the systems described above. Since the first tea batch is not fermented, it may simply be steeped in brew kettle 10 (step 600). Once the tea has been steeped and the tea liquor formed, loose tea and/or other tea particulates are strained from the teal liquor (step 602). Next sugar may be added to the tea liquor, and this mixture may serve as a nutrient source during the primary anaerobic fermentation process (step 633). While it may be advantageous to add sugar at this stage because the warmth of the tea liquor may facilitate dissolving the sugar, one will appreciate that the sugar may be added to the tea liquor after it has been transferred to primary anaerobic fermenter 20. In either case, the tea liquor may be pasteurized/sterilized in pasteurizer/sterilizer 17 and cooled in cooler 19 while the tea liquor is transferred from brew kettle 10 to anaerobic fermenter 20. One will appreciate that pasteurizing/sterilizing is optional in the case because the tea liquor is not fermented and thus will have minimal if any viable microbes therein. As noted above, one will appreciate that various methods may be utilized to pasteurize/sterilize and/or cool the tea liquor.

Once cooled, the unfermented tea solution is utilized to brew "beer" or "wine" (step 630) wherein the fermented tea solution is transferred to a primary fermentation vessel to serve as a nutrient solution for primary fermentation, and then transferred to a secondary fermentation vessel for further fermentation to provide an elevated ABV in the same manner as described above.

Like the methods described above, a second batch of fermented tea solution is concurrently prepared (step 640) that will later be used to mixed with the brew resulting from the secondary fermentation. The second batch of fermented tea solution may be produced by steeping tea in a vessel (step 641), straining loose tea and/or other tea particulates from the resulting tea liquor (step 642), adding sugar to the tea liquor (step 643), diluting and cooling the tea liquor (step 644) transferring to an open container and inoculating the tea liquor with a SCOBY to begin the tea fermentation process (step 645) in a manner similar to that discussed above. Like the embodiments described above, the second batch is not pasteurized/sterilized, the resulting solution is raw kombucha and/or raw Jun that contains live probiotic colonies and beneficial enzymes.

One will appreciate that the second batch of fermented tea is be prepared in different equipment than the first unfermented batch, namely in aerobic fermenter 12. However, the tea liquor of the second batch of fermented tea may be steeped in the same brew kettle as the first batch of unfermented tea or steeped in another suitable vessel.

Once the second batch and the secondary brew are ready, the two are mixed together in a mixing tank 29 (step 650) such that a final beverage is formed having a desired ABV of approximately 4% to 6%, and preferably in the range of 4.5% to 5.5%. Again, such mixing also serves to produce a desired flavor profile as well as reintroduce live probiotic colonies and beneficial enzymes into the final beverage. For example, the beer brew having an ABV of approximately 8-9% (step 630) and the second tea batch having an ABV of approximately 1% (step 640) may be mixed (step 650) in a 1:1 ratio in order to produce a kombucha-based alcoholic beverage having an ABV of approximately 4.5% to 5.5%.

Again, since the second batch of fermented tea solution is raw kombucha and/or Jun, it still contains active health-promoting probiotic colonies and beneficial enzymes, the final beverage will similarly be full of active health-promoting probiotic colonies and beneficial enzymes.

The foregoing descriptions of specific exemplary embodiments of the present invention have been presented for purposes of illustration and description. They are not intended to be exhaustive or to limit the invention to the precise forms disclosed, and obviously, many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for brewing a fermented alcoholic beverage comprising:
    a brew vessel for steeping tea in quantities of hot water to form a first tea liquor and a second tea liquor;
    a primary fermentation vessel for receiving the first tea liquor and one or more yeasts and one or more fermentables, the primary fermentation vessel configured for anaerobic fermentation of the first tea liquor into a primary alcoholic brew such that carbon dioxide released during primary fermentation escapes from the primary fermentation vessel during anaerobic fermentation and air is prevented from entering the primary fermentation vessel;
    a secondary fermentation vessel for receiving the primary alcoholic brew from the primary fermentation vessel, the secondary fermentation vessel configured for further anaerobic fermentation of the primary alcoholic brew to an elevated alcoholic brew having an elevated alcohol by volume (ABV) of at least 7%, the secondary fermentation vessel configured for anaerobic fermentation such that carbon dioxide released during further anaerobic fermentation escapes from the secondary fermentation vessel and air is prevented from entering the secondary fermentation vessel;
    an aerobic fermenter for fermenting the second tea liquor when mixed with sugar and inoculated with a symbiotic culture of bacteria and yeast ("SCOBY") to form a fermented tea liquor; and
    a mixing tank configured for mixing the elevated alcoholic brew having an ABV of at least 7% with the fermented tea liquor, the mixing tank dimensioned and configured to mix the elevated alcoholic brew and the fermented tea liquor in desired ratios to produce a fermented alcoholic beverage having a reduced ABV lower than the elevated ABV, wherein the fermented alcoholic beverage includes active probiotic colonies and the reduced ABV of approximately 3% to 7%.

2. A system for brewing a fermented alcoholic beverage according to claim 1, wherein the brew vessel is a heated liquor tank.

3. A system for brewing a fermented alcoholic beverage according to claim 1, wherein the aerobic fermenter includes a fermentation filter prevent outside contamination to the tea liquor/sugar mixture.

4. A system for brewing a fermented alcoholic beverage according to claim 1, further comprising a cooler for cooling the tea liquor.

5. A system for brewing a fermented alcoholic beverage according to claim 1, wherein the primary fermentation vessel includes an oxygen supply for aerating the tea liquor.

6. A system for brewing a fermented alcoholic beverage according to claim 1, wherein the primary fermentation vessel includes a first fermentation lock to allow carbon dioxide released during primary fermentation to escape from the primary fermentation vessel while preventing air from entering the primary fermentation vessel.

7. A system for brewing a fermented alcoholic beverage according to claim 1, wherein the secondary fermentation vessel includes a second fermentation lock to allow carbon dioxide released during further anaerobic fermentation to escape from the secondary fermentation vessel while preventing air from entering the secondary fermentation vessel.

8. A system for brewing a fermented alcoholic beverage according to claim 1, wherein the primary fermentation vessel includes a first fermentation lock to allow carbon dioxide released during primary fermentation to escape from the primary fermentation vessel while preventing air from entering the primary fermentation vessel.

9. A system for brewing a fermented alcoholic beverage comprising:
    a brew vessel for steeping tea in quantities of hot water to form a first tea liquor batch and a second tea liquor batch;
    a primary fermentation vessel downstream of the brew vessel for receiving the first tea liquor batch and one or more yeasts and one or more fermentables, the primary fermentation vessel configured for anaerobic fermentation of the first tea liquor batch into a primary alcoholic brew such that carbon dioxide released during primary fermentation escapes from the primary fermentation vessel during anaerobic fermentation and air is prevented from entering the primary fermentation vessel;
    a secondary fermentation vessel downstream of the primary fermentation vessel for receiving the primary alcoholic brew from the primary fermentation vessel, the secondary fermentation vessel configured for further anaerobic fermentation of the primary alcoholic brew to an elevated alcoholic brew having an elevated alcohol by volume (ABV) of at least 7%, the secondary fermentation vessel configured for anaerobic fermentation such that carbon dioxide released during further anaerobic fermentation escapes from the secondary fermentation vessel and air is prevented from entering the secondary fermentation vessel;

an aerobic fermenter downstream of the brew vessel for fermenting the second tea liquor batch when mixed with sugar and inoculated with a symbiotic culture of bacteria and yeast ("SCOBY") to form a fermented tea liquor; and a mixing tank (i) downstream of the secondary fermenter and (ii) downstream of the anerobic fermenter, the mixing tank configured for (i) receiving the elevated alcoholic brew from the secondary fermentation vessel and (ii) receiving the fermented tea liquor from the aerobic fermenter without transfer of the fermented tea liquor through the primary and secondary fermentation vessels, wherein the mixing tank is dimensioned and configured for mixing the elevated alcoholic brew having an ABV of at least 7% with the fermented tea liquor in desired ratios to produce a fermented alcoholic beverage having a reduced ABV lower than the elevated ABV, wherein the fermented alcoholic beverage includes active probiotic colonies and the reduced ABV is approximately 3% to 7%.

10. A system for brewing a fermented alcoholic beverage according to claim 9, wherein the brew vessel is a heated liquor tank.

11. A system for brewing a fermented alcoholic beverage according to claim 9, wherein the aerobic fermenter includes a fermentation filter prevent outside contamination to the second tea liquor batch/sugar mixture.

12. A system for brewing a fermented alcoholic beverage according to claim 9, further comprising a cooler downstream of the brew kettle and upstream of the primary anaerobic fermentation vessel, the cooler configured for cooling the first tea liquor batch.

13. A system for brewing a fermented alcoholic beverage according to claim 9, wherein the primary fermentation vessel includes an oxygen supply for aerating the tea liquor.

14. A system for brewing a fermented alcoholic beverage according to claim 9, wherein the secondary fermentation vessel includes a second fermentation lock to allow carbon dioxide released during further anaerobic fermentation to escape from the secondary fermentation vessel while preventing air from entering the secondary fermentation vessel.

15. A system for brewing a fermented alcoholic beverage according to claim 9, further comprising a microbe reducer downstream of the brew kettle and upstream of the primary anaerobic fermentation vessel, the microbe reducer configured to reduce the number of viable microbes within the first tea liquor batch.

16. A system for brewing a fermented alcoholic beverage according to claim 9, further comprising a hard-tea anaerobic fermenter downstream of the brew kettle and upstream of the primary fermentation vessel.

* * * * *